United States Patent
Ando

(10) Patent No.: US 6,304,724 B1
(45) Date of Patent: *Oct. 16, 2001

(54) CAMERA WITH ELASTIC GASKET FOR PROVIDING WATERTIGHT SEAL

(75) Inventor: Hiroyuki Ando, Hachioji (JP)

(73) Assignee: Olympus Optical Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,074

(22) Filed: Dec. 14, 1998

(30) Foreign Application Priority Data

Dec. 18, 1997 (JP) .................................................. 9-348383

(51) Int. Cl.⁷ .................................................. G03B 17/08
(52) U.S. Cl. .............................................. 396/29; 277/644
(58) Field of Search ................................ 396/25, 26, 27, 396/28, 29; 277/644, 626, 921

(56) References Cited

U.S. PATENT DOCUMENTS

| | | | | |
|---|---|---|---|---|
| 3,640,424 | * | 2/1972 | Ando | 396/25 |
| 4,312,580 | * | 1/1982 | Schwomma et al. | 396/26 |
| 4,803,504 | * | 2/1989 | Maeno et al. | 396/29 |
| 5,445,393 | * | 8/1995 | Ramberg | 277/643 |
| 5,507,504 | * | 4/1996 | Neumann et al. | 277/302 |
| 5,597,166 | * | 1/1997 | Grytz et al. | 277/644 |
| 5,713,048 | * | 1/1998 | Hayakawa | 396/25 |

* cited by examiner

Primary Examiner—David M. Gray
(74) Attorney, Agent, or Firm—Ostrolenk, Faber, Gerb & Soffen, LLP

(57) ABSTRACT

A camera has a rubber gasket arranged between a rear lid and a rear cover and including an engagement portion which is deformable in the direction in which the rear lid is closed and is put into tight engagement with the rear lid, and a fin portion which extends in a direction substantially perpendicular to the direction in which the rear lid is closed and which remains in contact with the edge portion of the opening of the rear cover. With this structure of the rear lid, the camera features watertightness and lighttightness.

11 Claims, 5 Drawing Sheets

CAMERA WITH ELASTIC GASKET FOR PROVIDING WATERTIGHT SEAL

BACKGROUND OF THE INVENTION

1. Field of the Invention

The present invention relates to a camera and, more particularly, to a camera featuring watertightness.

2. Related Art Statement

Cameras featuring a low-level watertightness, or daily-life level watertightness, are in widespread use. Most of the cameras featuring the daily-life level watertightness employ rubber formed in a ring gasket around the periphery of a film loading rear lid. The rubber gasket is pressed and then deformed by the rear lid when it is closed. With the rubber gasket in a tight engagement with the rear cover, water and light are blocked.

FIG. 12 is a cross-sectional view showing a profile of a peripheral edge of the rear lid and its associated components. The rear lid 20 has a U-shaped groove 20a into which a lid rubber gasket 21 to be described later is fastened with an adhesive. The rear lid 20 is seated onto a rear cover 22 with a clearance kept therebetween. A step 20b is formed on the rear lid 20.

Formed on the rear cover 22 are an abutment face 22a which the edge of the lid rubber gasket 21, when pressed, is deformed thereagainst to be put into tight engagement therewith, and a step 22b on which the rear lid 20 is supported with a gap kept therebetween. The lid rubber gasket 21 has an edge 21a which is deformed by and is put into tight engagement with the abutment face 22a of the rear cover.

The step 20b of the rear lid and the 22b of the rear cover conventionally reduces light rays that enter through the gap between the rear cover and the rear lid and reach the edge 21a of the lid rubber gasket.

To fully block water and light in the conventional camera, preferably the rubber is much deformed to increase the contact pressure with the rear lid, but the amount of deformation of the rubber is not so great so as to overpower the force required to close the rear lid. The use of the rubber may block water, but cannot fully block light. For this reason, outside the engagement portion of the rubber gasket, the rear lid and the rear cover which the rear lid is snapped into are matingly shaped in one form or another, such as with the step as described above.

The arrangement of the mating portion or a step presents difficulty in implementing a compact design. To realize a compact camera, watertightness and lighttightness must be assured using structure other than a matingly shaped portion.

SUMMARY OF THE INVENTION

Accordingly, it is an object of the present invention to provide a compact camera which features good watertightness and lighttightness without forming a matingly shaped portion or a step.

The camera of the present invention includes an openable lid member, a cover having an opening in which the lid member is seated when the lid member is closed, an elastic member arranged on the lid member or on the cover for tight engagement with the edge portion of the opening of the cover or for tight engagement with the lid member when the lid member is closed, wherein the elastic member includes an engagement portion which is deformed in the direction in which said lid member is opened and closed under the pressure generated when the lid member is closed, and a fin portion that fills a gap that is created between the lid member and the cover when the lid member is closed.

In the above camera, the fin portion bridges the gap that is left between the lid member and the cover when the lid member is closed.

DESCRIPTION OF THE PREFERRED EMBODIMENTS

Figure 1:
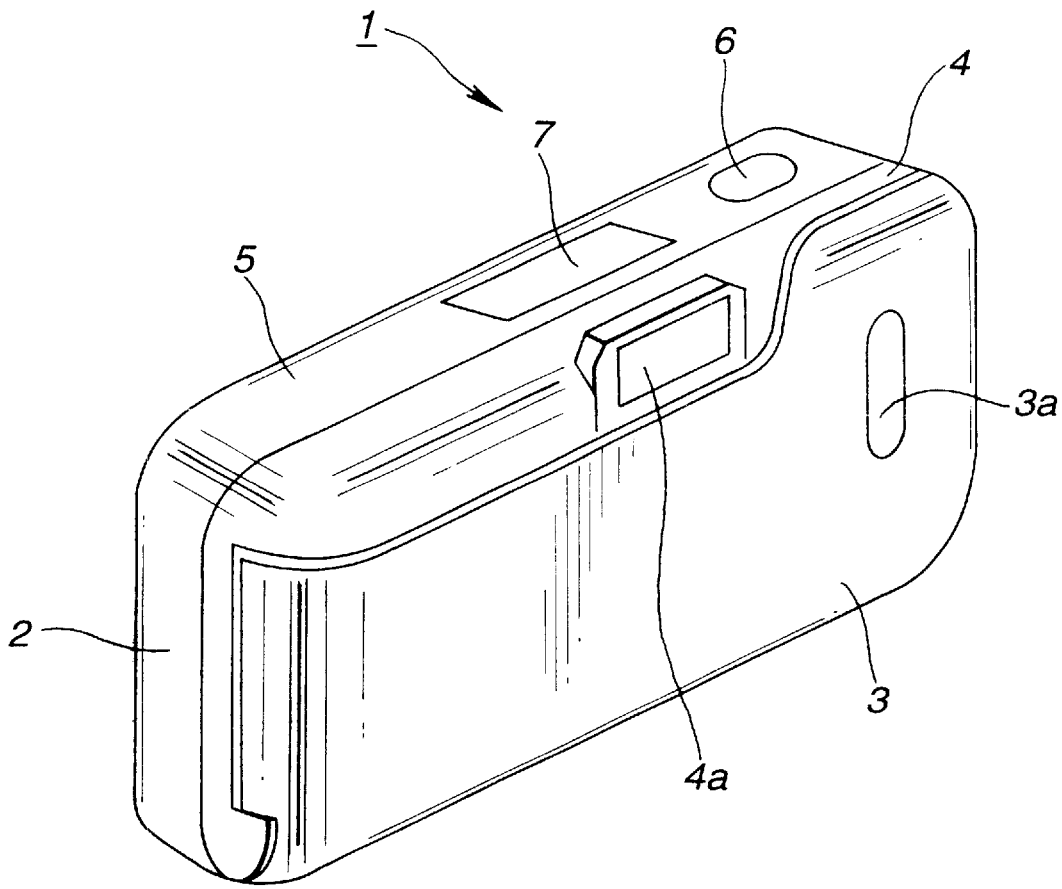
FIG. 1 is a perspective view of a camera of a first embodiment of the present invention.

Referring to the drawings, the embodiments of the present invention are discussed.

FIG. 1 is a perspective view of a camera 1 of a first embodiment of the present invention.

The camera 1 has rear lid 3 that is opened and closed to load a film cartridge. The rear lid 3 is provided with an observation window 3a through which a photographer checks whether a film cartridge is loaded in the camera 1 and the type of the film if loaded.

The camera 1 has an outer housing constructed of the rear lid 3, a rear cover 4 in which the rear lid 3 is seated when the rear lid 3 is closed, and a front cover 5 which is engaged with the rear cover 4. Within the outer housing, the camera 1 has an unshown camera body as a main unit which includes a finder, an imaging lens and so on, for performing a variety of functions.

Mounted on the top surface of the front cover 5 are a release button 6 and a display window 7 for displaying an exposed film frame count and a photograph mode.

Figure 2:
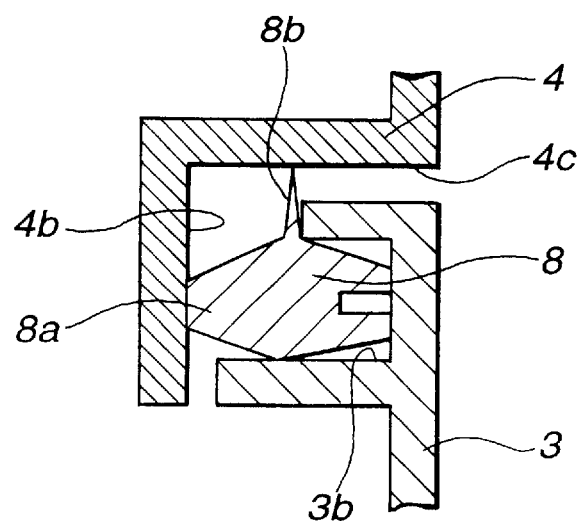
FIG. 2 is a cross-sectional view of a peripheral edge of a rear lid and a rear cover in their engaged state of the camera shown in FIG. 1.

Referring to FIG. 2, the engagement state of the rear lid 3 with the rear cover 4 is discussed. FIG. 2 is a cross-sectional view showing a relevant portion of the engagement state of the rear lid 3 with the rear cover 4.

The rear lid 3 has a U-shaped groove 3b around its periphery. A lid rubber gasket 8 is secured in the groove 3b with an adhesive or similar compound.

The rear cover 4 has, around its opening, an abutment face 4b against which the edge of the lid rubber gasket 8 is deformable and is put into tight engagement therewith when the lid 3 is closed, and a wall surface 4c along which the rear lid 3 is supported with a certain gap kept therebetween.

The lid rubber gasket 8 has an edge portion 8a that is deformed when it is put into tight engagement with the abutment face 4b of the rear cover, and a fin portion 8b extends perpendicularly to and is in contact with the wall surface 4c of the rear cover. The edge of the fin portion 8b is slightly bent when it is put into contact with the wall surface 4c of the rear cover. The fin portion 8b reduces the amount of light rays that reach the edge portion 8a of the lid rubber gasket 8 after leaking in through the gap between the rear cover 4 and the rear lid 3.

Figure 12:
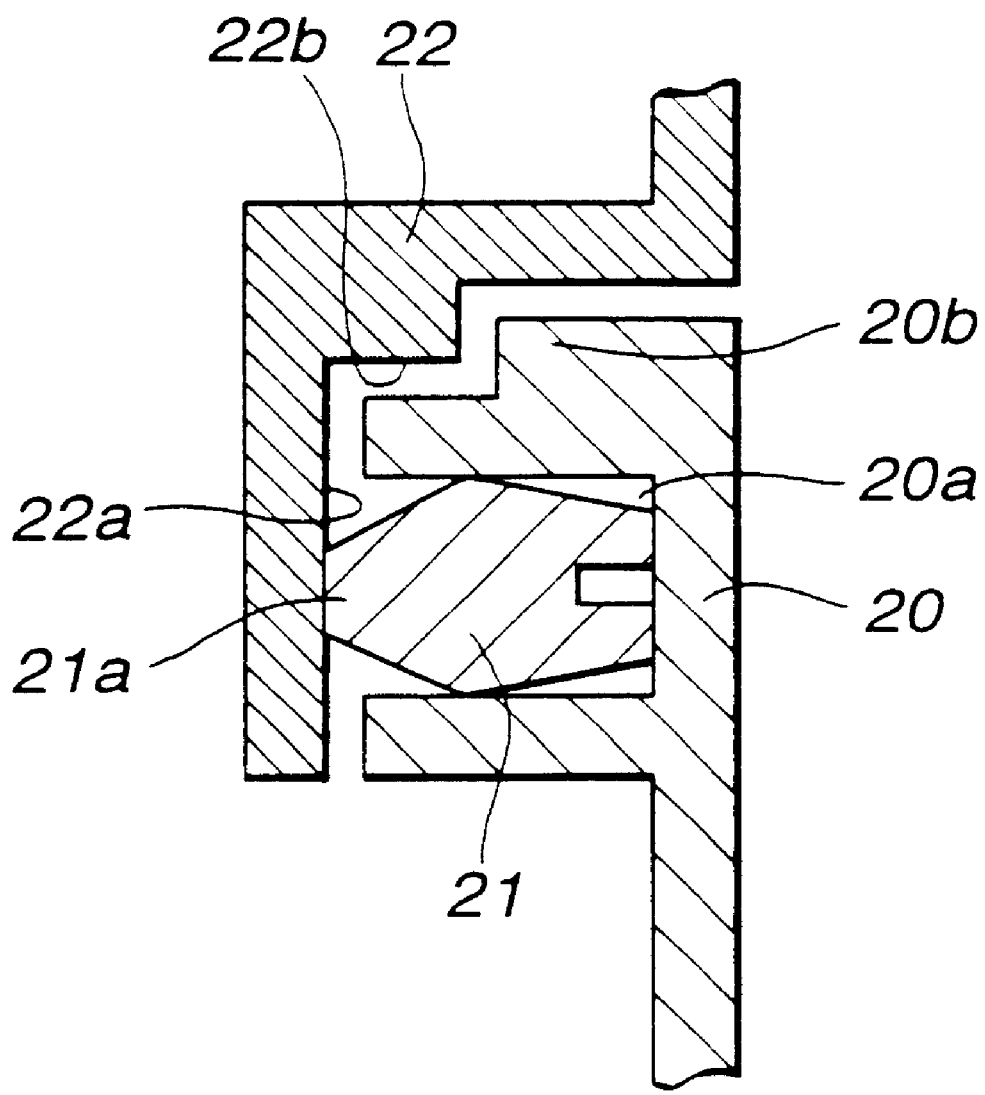
FIG. 12 is a cross-sectional view showing the profile of a peripheral edge of a rear lid in a conventional camera.

As clearly seen from comparing the construction shown in FIG. 2 with the conventional camera shown in FIG. 12, the conventional camera requires the extra width for the step shown in FIG. 12. The camera constructed in accordance with the first embodiment is more compact, saving the space corresponding to width of the step in the embodiment of FIG. 12.

Figure 3:
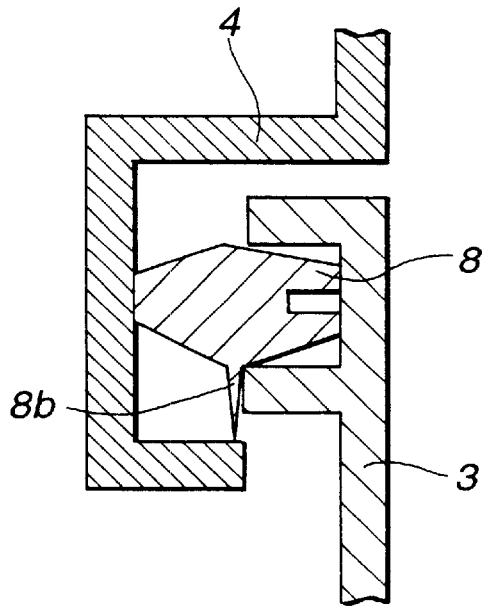
FIG. 3 is a cross-sectional view showing a modification of the first embodiment shown in FIG. 1.
Figure 4:
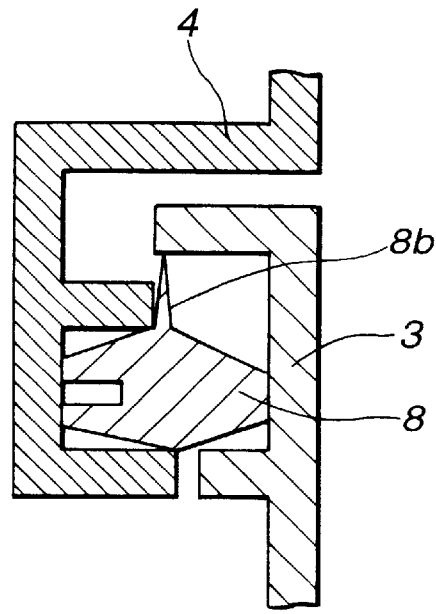
FIG. 4 is a cross-sectional view showing another modification of the first embodiment shown in FIG. 1.

FIG. 3 is a cross-sectional view showing a modification of the first embodiment. As shown in FIG. 3, the fin portion 8b is arranged on the inner circumference of the lid rubber gasket 8. FIG. 4 is a cross-sectional view showing another modification of the first embodiment.

As shown in FIG. 4, the lid rubber gasket 8 is arranged on the camera body. The function and operation remain identical to those of the first embodiment.

Figure 5:
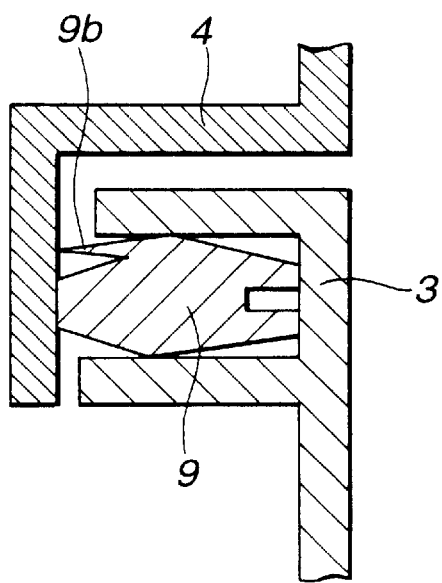
FIG. 5 is a cross-sectional view showing a profile of a peripheral edge of the rear lid and the rear cover of a camera of a second embodiment of the present invention.

Referring to FIG. 5, a second embodiment of the present invention is now discussed. FIG. 5 is a cross-sectional view showing a major portion of a peripheral edge of a rear lid and its associated components in the camera of the second embodiment.

In the second embodiment shown in FIG. 5, components identical to those in the first embodiment are designated with the same reference numerals, and a detailed discussion thereof is omitted here.

Figure 6:
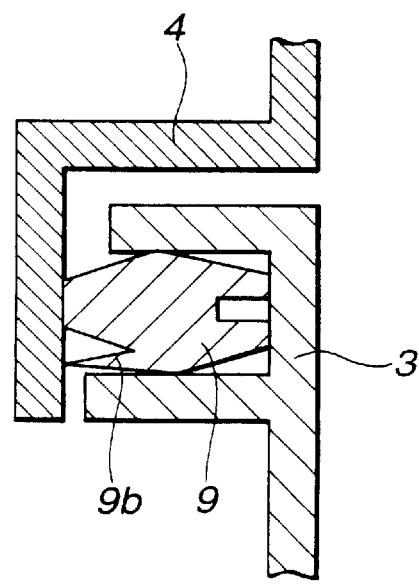
FIG. 6 is a cross-sectional view showing a modification of the second embodiment shown in FIG. 5.

Instead of the fin portion as provided in the first embodiment, the second embodiment employs a fin portion 9b projecting in substantially the same direction as the direction in which a lid rubber gasket 9 is pressed. The fin portion 9b may alternatively be arranged on the inner circumference of the lid rubber gasket 9 as shown in FIG. 6.

Figure 7:
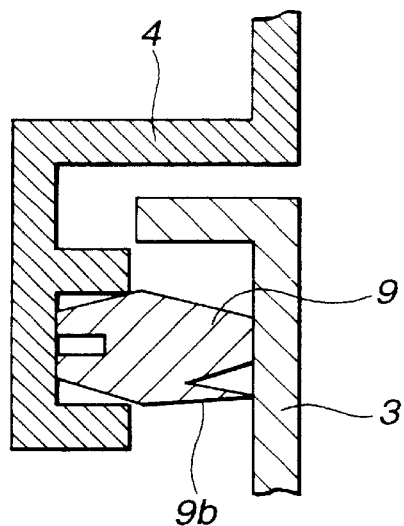
FIG. 7 is a cross-sectional view showing another modification of the second embodiment shown in FIG. 5.

FIG. 7 shows another modification of the second embodiment in which the lid rubber gasket 9 is mounted on the camera body. The function and operation of the modification remain identical to those of the second embodiment.

Figure 8:
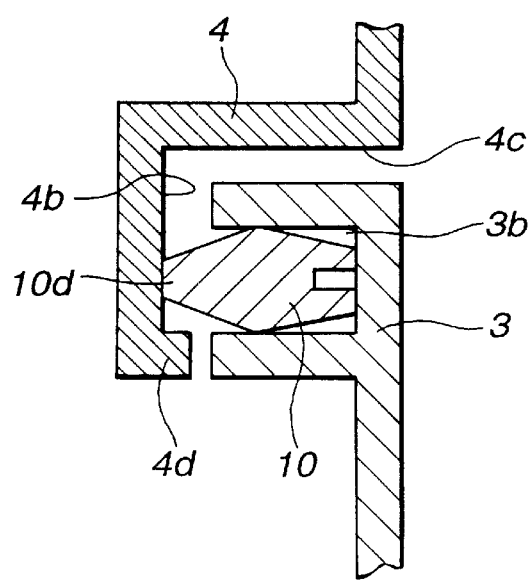
FIG. 8 is a cross-sectional view showing a profile of a peripheral edge of the rear lid and the rear cover of a camera of a third embodiment of the present invention.

A third embodiment of the present invention is now discussed with reference to FIG. 8. FIG. 8 is a cross-sectional view showing a major portion of a peripheral edge of a rear lid and its associated components in the camera of the third embodiment.

A rear lid 3 is provided with a U-shaped groove 3b into which a lid rubber gasket 10 is secured with an adhesive or similar compound.

The rear cover 4 has, around its opening, an abutment face 4b against which the edge of the lid rubber gasket 10 is deformable and is put into tight engagement therewith when the lid 3 is closed, and a wall surface 4c along which the rear lid 3 is supported with a certain gap kept therebetween, and a step portion 4d arranged inside the engagement portion of the lid rubber gasket 10 and projecting in the direction opposite to the direction in which the lid rubber gasket is pressed upon closure of the rear lid.

The lid rubber gasket 10 has an end portion 10d that is deformable against and is put into tight engagement with the abutment face 4b of the rear cover 4.

The internal step portion 4d blocks light rays that enter around the end portion 10d of the lid rubber gasket after leaking in through the gap between the rear cover 4 and the rear lid 3 and prevents the film from being exposed thereto.

Figure 9:
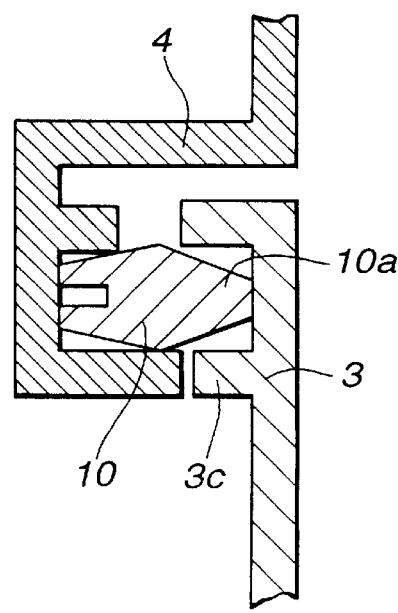
FIG. 9 is a cross-sectional view showing a modification of the third embodiment shown in FIG. 8.

FIG. 9 shows a modification of the camera of the third embodiment in which the lid rubber gasket 10 is arranged on the camera body. The function and operation of the modification remain unchanged from those of the second embodiment. A step portion 3c shown in FIG. 9 plays an important role, such that even if light rays leak around the rubber end 10a, they are blocked by this step portion 3c.

Figure 10:
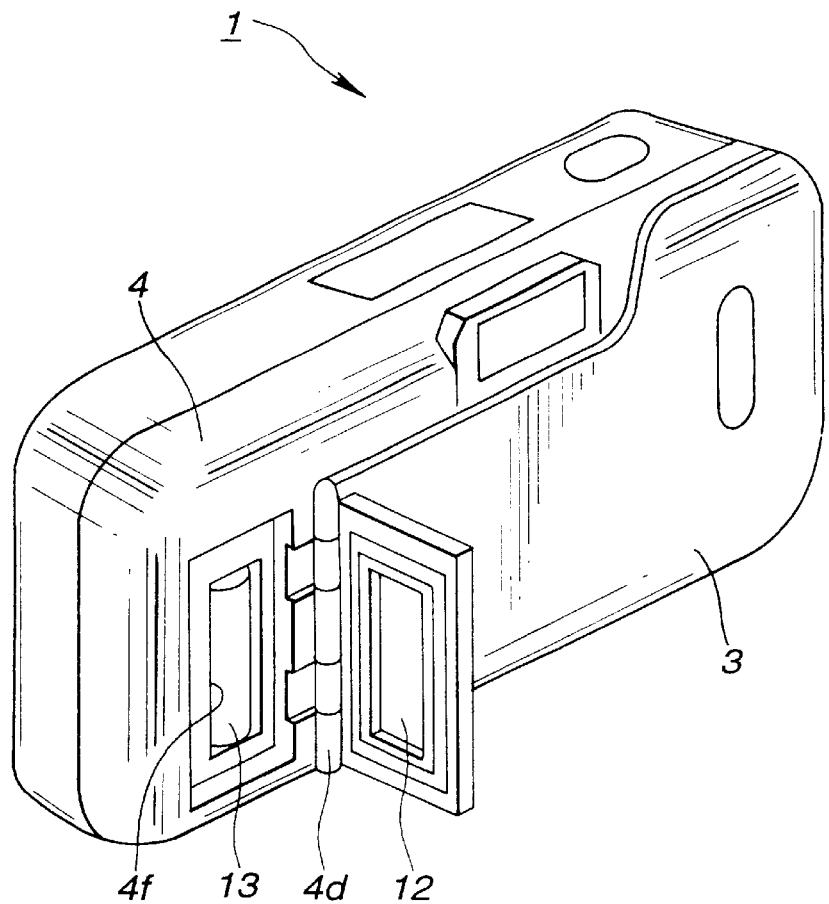
FIG. 10 is a perspective view of a camera of a fourth embodiment of the present invention.
Figure 11:
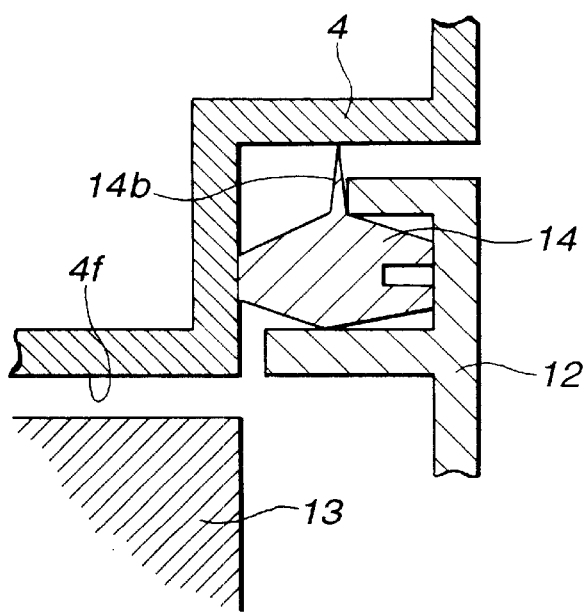
FIG. 11 is a vertical sectional view showing a battery chamber and a battery chamber lid of the camera shown in FIG. 10.

A fourth embodiment of the present invention is now discussed with reference to FIG. 10 and FIG. 11. FIG. 10 is a perspective view of a camera according to the fourth embodiment of the present invention. FIG. 11 is a cross-sectional view showing a relevant portion of the fourth embodiment.

In the fourth embodiment, the arrangement of the first embodiment is incorporated in a battery chamber lid. FIG. 11 shows a cross section of a battery chamber 4f and the battery chamber lid 12 shown in FIG. 10.

In this camera, the same hinge 4d is shared by a rear lid 3 which is opened and closed to load and unload a film cartridge and by the battery chamber lid 12 for housing a battery 13. The structure in which a lid rubber gasket 14 is provided with a fin portion 14b for watertightness and lighttightness is identical to that of the first embodiment, and the discussion thereof is not repeated here. The arrangement shown here is not limited to the battery chamber lid 12, and may be applied to any other structure which incorporates a lid member for lighttightness and/or watertightness.

For example, lighttightness may be imparted to the battery chamber lid 12. As more compact designs are promoted in cameras today, their internal structure must be simpler. Such simpler designs occasionally fail to ensure sufficient tightness in the battery chamber, and sufficient lighttightness for the film. The use of the structures of the present invention easily enhances lighttightness.

In a camera having no near cover in the present invention, the lid rubber gasket may be directly put into tight engagement with the camera body, or the fin portion 8b may be directly put into contact with the camera body.

The camera of the present invention dispenses with the matingly shaped portion or step conventionally arranged outside the rubber gasket. The use of the fin portion or the slight step inside the rubber gasket blocks water and light, and promotes a compact design in a camera having a daily-life level of watertightness.

What is claimed is:

1. A camera comprising:
    an openable lid member having an inner face and a groove which is substantially U-shaped in cross-section extending around the periphery of the lid member on said inner face;
    a cover having an opening in which said lid member is seated when said lid member is closed, said cover further having a groove which is substantially U-shaped in cross-section extending around the periphery of said opening; and
    an elastic member arranged in the groove of one of said lid member or said cover to provide tight engagement between the periphery of said opening of said cover and said lid member when said lid member is closed, said elastic member being substantially enclosed between the grooves of said lid member and said cover when said lid member is closed, wherein said elastic member includes an engagement portion which is compressed in a direction in which said lid member is opened and closed under pressure generated when said lid member is closed, and a fin portion that bridges a gap that is formed between said lid member and said cover when said lid member is closed.

2. A camera according to claim 1, wherein said elastic member is arranged on said lid member and said fin portion remains in contact with the edge portion of said opening of said cover when said lid member is closed.

3. A camera according to claim 1, wherein said elastic member arranged on said cover and said fin portion remains in contact with said lid member when said lid member is closed.

4. A camera according to claim 2, wherein said fin portion projects in a direction perpendicular to the direction in which said lid member is opened and closed.

5. A camera according to claim 3, wherein said fin portion projects in a direction perpendicular to the direction in which said lid member is opened and closed.

6. A camera according to claim 1, wherein said elastic member blocks water and light from entering the camera through said opening in said cover.

7. A camera according to claim 1, wherein said lid member is a rear lid.

8. A camera according to claim 1, wherein said lid member is openable to load and unload a film cartridge.

9. A camera according to claim 1, wherein said lid member is a battery chamber lid.

10. A camera comprising:

a member having an opening, said member further having a groove which is substantially U-shaped in cross-section extending the periphery of said opening;

a lid member for covering said opening, said lid member having an inner face and a groove which is substantially U-shaped in cross-section extending around the periphery of said lid member on said inner face;

a gasket member which is arranged in the groove of one of said member having the opening and said lid member, such that said gasket member is substantially enclosed between the grooves of said member having the opening and said lid member and is compressed between said member having the opening and said lid member when said opening is covered with said lid member; and a fin portion which is arranged on said gasket member so as to become bent and bridge a gap between said opening and said lid member when said opening is covered with said lid member.

11. A camera comprising:

an openable lid member;

a cover having an opening in which said lid member is seated when said lid member is closed;

a groove extending around the periphery of one of said lid members or said opening of said cover; and an elastic member arranged around the periphery of said one of said lid member or said opening of said cover to provide tight engagement between said cover and said lid member when said lid member is closed, wherein said elastic member includes an engagement portion positioned in said groove and which is compressed in a direction in which said lid member is opened and closed under pressure generated when said lid member is closed, and a fin extending from the engagement portion to a distal tip in a direction perpendicular to the direction in which said engagement portion is compressed when the lid member is closed, and wherein the distal tip of said fin comes into contact with the other of said lid member and said cover in which said engagement portion is not disposed when said lid member is closed, so as to form a bridge between said engagement portion and said other of said lid member and said cover in said direction perpendicular to the direction in which said engagement portion is compressed when the lid member is closed.

\* \* \* \* \*